No. 807,537. PATENTED DEC. 19, 1905.
E. M. BIRDSALL.
PNEUMATIC TIRE.
APPLICATION FILED JAN. 26, 1904. RENEWED MAY 22, 1905.
2 SHEETS—SHEET 2.
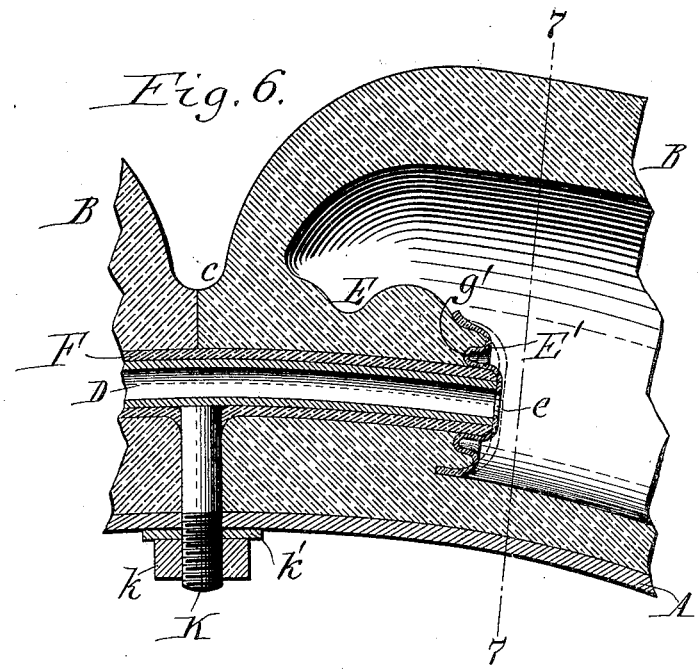
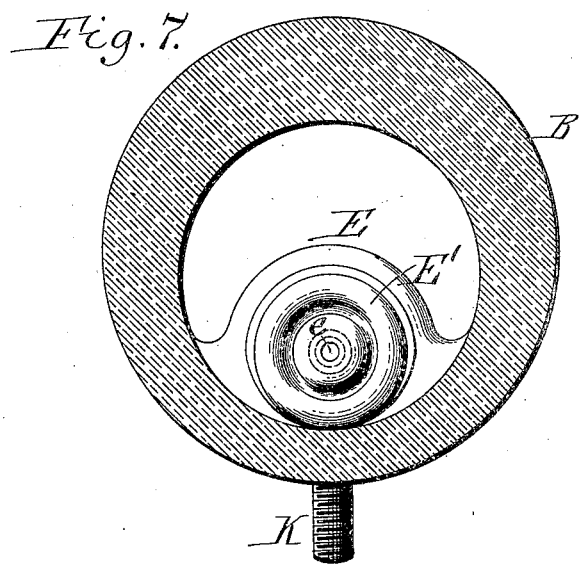

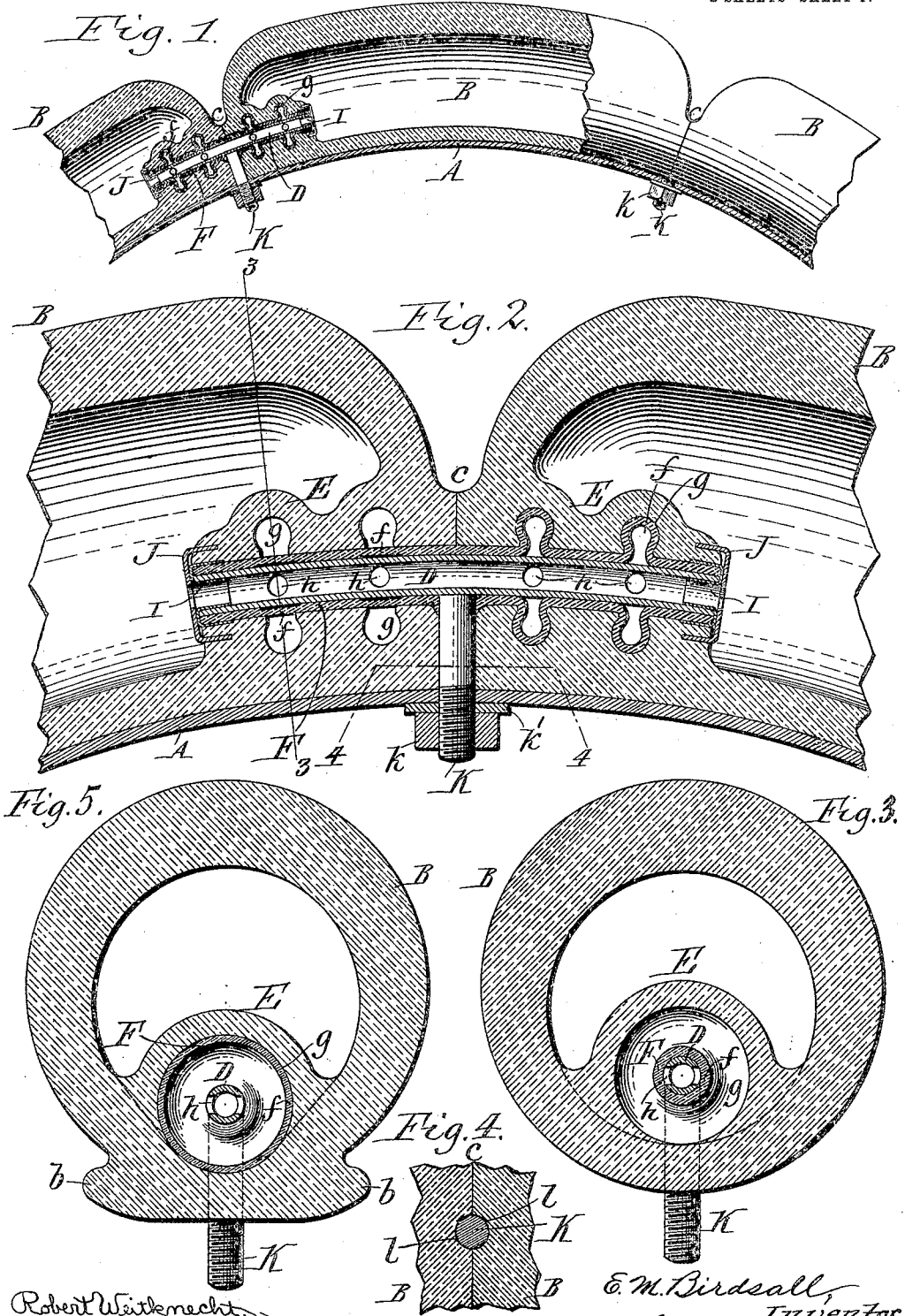

UNITED STATES PATENT OFFICE.

EDGAR M. BIRDSALL, OF BUFFALO, NEW YORK, ASSIGNOR OF ONE-HALF TO MARY B. BIRDSALL AND ONE-HALF TO FLETCHER J. BARRON, OF BUFFALO, NEW YORK.

PNEUMATIC TIRE.

No. 807,537.      Specification of Letters Patent.      Patented Dec. 19, 1905.

Application filed January 26, 1904. Renewed May 22, 1905. Serial No. 261,665.

*To all whom it may concern:*

Be it known that I, EDGAR M. BIRDSALL, a citizen of the United States, residing at Buffalo, in the county of Erie and State of New York, have invented new and useful Improvements in Pneumatic Tires, of which the following is a specification.

This invention relates to a pneumatic tire of the class which is shown in my United States Letters Patent No. 647,643, dated April 17, 1900, and in which the tire is composed of a series of communicating inflatable sections detachably secured to the wheel-rim, so that damaged sections can be removed and repaired or replaced by new sections. The invention has more particular reference to tires of this type in which rigid connecting-tubes are inserted in coinciding openings in the adjoining ends of the tire-sections to prevent collapsing of the connecting-passages between the air-chambers of the sections.

The object of my invention is the provision of simple and effective means for securing air-tight joints between the tire-sections and their connecting-tubes.

In the accompanying drawings, Figure 1 is a side elevation, partly in section, of a portion of a tire embodying the invention. Fig. 2 is a fragmentary longitudinal section of two of the tire-sections on an enlarged scale. Fig. 3 is a transverse section in line 3 3, Fig. 2. Fig. 4 is a fragmentary longitudinal section of the base portions of two abutting tire-sections in line 4 4, Fig. 2, showing their bolt-recesses. Fig. 5 is a section similar to Fig. 3, showing the base of the tire flanged to form a clench-tire. Fig. 6 is a fragmentary longitudinal section of one of the tire-sections, showing a modification of the invention. Fig. 7 is a cross-section in line 7 7, Fig. 6.

Similar letters of reference indicate corresponding parts throughout the several views.

A indicates the wheel-rim, provided, as usual, with a circumferential groove in which the tire-sections B are arranged and secured end to end. The tire-sections are constructed of rubber or other suitable elastic or yielding material and may be of any desired form. In the form shown in Figs. 1, 2, and 3 of the drawings they are cylindrical nearly throughout their ends, while in the construction illustrated in Fig. 4 the sections are provided with a flanged base *b* to form a clench-tire. Each tire-section is provided at its ends with reduced portions or short necks *c*, having straight ends which abut against the corresponding portions of adjoining sections and in which are formed longitudinal openings coinciding with the corresponding openings of the contiguous sections. In the alined openings of each pair of abutting sections is arranged a rigid connecting-tube D, of metal or other suitable material, which opens into the air-chambers of the sections to form a conduit by which the air-chambers of the adjoining sections are placed in communication with each other. In order to form extensive bearings for this tube, the end portions of the tire-sections are provided with internal bosses, housings, or enlargements E, throughout the length of which the connecting-tube extends.

F indicates a tubular envelop or covering of elastic sheet-rubber or similar yielding material impervious to air, which surrounds the rigid tube D and extends from end to end thereof. This covering is preferably secured to the rigid tube at intervals by cementing, vulcanizing, or otherwise, while the intervening portions *f* of the covering are free or detached from the tube and adapted to be inflated by the air-pressure within the tire-sections and expanded into grooves, cavities, or recesses *g*, formed in the tube-housings or thickened portions E of the tire-sections around the tube. For this purpose the rigid tube D is provided in its wall opposite the unattached portions *f* of its elastic envelop with apertures *h*, through which the compressed air may pass for acting upon said unattached portions. In Fig. 1 all the detached portions of two abutting tire-sections are represented as being inflated into the cavities *g*, while in Fig. 2 the detached portions of the right-hand tire-section are shown inflated and those of the left-hand section are shown in their normal or deflated condition. When the tire-sections are inflated and the detached portions of the tube-envelop expanded into the cavities *g*, as above described, these expanded portions extend across the joint between the tube and the surrounding walls of the openings in which it is seated and practically form hollow packing rings or beads, which extend wholly around the rigid tube, producing an absolutely air-tight joint between the tube and the tire-sections connected by the same.

The grooves or cavities g are preferably annular, as shown in the drawings, but may be of any other suitable form. The elastic envelop may be detached from the rigid tube at a greater or less number of places, the tire-sections being provided with a corresponding number of cavities g. If desired, the elastic envelop may be detached at but two places, one within each of two abutting sections; but the same is preferably provided with at least two detached portions within each section, as shown in the drawings, to insure a reliable joint. The ends of the tubular envelop are preferably protected by double thimbles I, of metal or other suitable material, which fit into the rigid tube D and over the envelop, as best shown in Fig. 2. For the purpose of reinforcing the inner ends of the housings or enlargements E caps J, of metal or other rigid material, may be applied thereto, these caps being vulcanized in the enlargements and provided with central openings, which coincide with the inner tubes of the thimbles I.

Any suitable means may be employed for securing the connected tire-sections to the wheel-rim. In the construction shown in the drawings each of the rigid connecting-tubes D is provided midway of its ends with a bolt or screw-stem K, which is arranged between the adjoining tire-sections and passes through an opening in the wheel-rim, a clamping-nut k and a washer k' being applied to the bolt. Upon tightening this bolt the adjoining portions of the connected tire-sections are firmly drawn against the wheel-rim. The connecting-tube is preferably curved concentrically with the wheel-rim, as shown. Its bolt K is seated in semicircular recesses or depressions l, formed in the abutting ends of the sections, as shown in Fig. 4.

In assembling the sections of the tire, a connecting-tube D, with its surrounding covering D, is inserted in one of an adjoining pair of sections until its bolt K abuts against the end of the section, and the other section is then passed over the projecting portion of the tube. The remaining tubes are inserted in like manner, and after connecting all of the tire-sections the tire is secured to the wheel-rim by means of the bolts K and nuts k. The detached portions of the tubular envelop or packing F when deflated lie against the connecting-tube D, and therefore permit the easy insertion of the latter in its seats in the ends of the tire-sections. It is not essential that the envelop should be securely attached to the connecting-tube, and, if desired, it may be held thereon simply by friction. I prefer, however, to secure it to the tube at intervals to guard against displacement of the envelop on the tube and facilitate the insertion of the tube in the end openings of the tire-sections.

My invention contemplates, broadly, the use of an inflatable packing which when expanded extends across the joint between the connecting-tube and the adjacent portions of the tire-sections, and the packing is not necessarily arranged to be expanded radially of the tube. For example, as shown in Figs. 6 and 7, the packing may be applied to the inner end of the tube-housing in the form of a yielding or elastic diaphragm E', the margin of the diaphragm being vulcanized or otherwise secured to the housing, while its central portion is detached from the housing and the connecting-tube. In this case the housing is provided in its inner end around the tube with an annular cavity g', into which the diaphragm is expanded by the air-pressure within the tire-section, as shown by full lines in Fig. 6, the deflated condition of the diaphragm being indicated by dotted lines in said figure. The diaphragm is provided with a central air-aperture e, which registers with the connecting-tube.

This improved joint, while being absolutely air-tight, is arranged wholly within the tire-sections and employs no parts which are liable to cut the rubber sections.

I claim as my invention—

1. The combination of an inflatable tire-section, a connecting-tube arranged in the end of the section and communicating with the air-chamber thereof, and an inflatable packing interposed between said tube and the surrounding portion of the tire-section, substantially as set forth.

2. The combination of a pair of inflatable tire-sections, a tube arranged in the adjoining ends of the sections and connecting the air-chambers thereof, and a yielding packing arranged between said connecting-tube and the surrounding portions of the tire-sections and exposed to the air-pressure within the tire-sections, substantially as set forth.

3. The combination of a pair of inflatable tire-sections, a tube arranged in the adjoining ends of the sections and connecting the air-chambers thereof, and a yielding packing surrounding said connecting-tube and having its inner surface exposed to the air-pressure within the tube and the tire-sections, substantially as set forth.

4. The combination of a pair of inflatable tire-sections, a tube arranged in the adjoining ends of the sections and connecting the air-chambers thereof, and an elastic envelop or covering secured to said tube and having a portion or portions thereof detached from the tube, the tube being provided opposite said detached portions with air-passages through which the inner sides of said detached portions are exposed to the air-pressure in the tube and the tire-sections, substantially as set forth.

5. The combination of a pair of inflatable tire-sections, a tube arranged in the adjoining ends of the sections and connecting the air-chambers thereof, each section being provided adjacent to the wall of said tube with a recess or cavity, and an inflatable packing applied to the outer side of said tube, extending normally across said cavity and having its inner surface exposed to the air-pressure in the tube, whereby the packing is expanded into said cavities by the air-pressure, substantially as set forth.

6. The combination of a pair of inflatable tire-sections, a connecting-tube arranged in the adjoining ends of the sections and provided with lateral air-passages, the tire-sections being provided opposite said air-passages with grooves or cavities which surround the connecting-tube, and an elastic covering or envelop applied to said tube and adapted to be expanded into said cavities by the air-pressure in the tire-sections, substantially as set forth.

7. The combination of a pair of inflatable tire-sections, a connecting-tube arranged in the adjoining ends of the sections and provided with lateral air-passages, the tire-sections being provided opposite said air-passages with grooves or cavities which surround the connecting-tube, and an elastic covering surrounding said tube, the covering being secured to the tube only at intervals and the intervening detached portions of the covering being located opposite said cavities and air-passages, substantially as set forth.

8. An inflatable tire-section provided in its end with a longitudinal opening adapted to receive a connecting-tube, and in the wall of said opening with an annular cavity or recess adapted to receive an inflatable packing, substantially as set forth.

Witness my hand this 22d day of January, 1904.

EDGAR M. BIRDSALL.

Witnesses:
CARL F. GEYER,
EMMA M. GRAHAM.